US007469355B1

(12) United States Patent
Chong

(10) Patent No.: US 7,469,355 B1
(45) Date of Patent: Dec. 23, 2008

(54) AUTO TUNE DYNAMIC OVER CLOCKING

(75) Inventor: Hon Fei Chong, Campbell, CA (US)

(73) Assignee: Nvidia Corporation, Santa Clara, CA (US)

( * ) Notice: Subject to any disclaimer, the term of this patent is extended or adjusted under 35 U.S.C. 154(b) by 735 days.

(21) Appl. No.: 10/974,089

(22) Filed: Oct. 26, 2004

(51) Int. Cl.
*G06F 1/04* (2006.01)

(52) U.S. Cl. ...................... 713/600; 375/235

(58) Field of Classification Search ............... 713/600; 375/235
See application file for complete search history.

(56) References Cited

U.S. PATENT DOCUMENTS

| | | | | |
|---|---|---|---|---|
| 5,451,892 | A * | 9/1995 | Bailey | 327/113 |
| 5,630,110 | A * | 5/1997 | Mote, Jr. | 713/501 |
| 6,363,490 | B1 * | 3/2002 | Senyk | 713/300 |
| 6,535,986 | B1 * | 3/2003 | Rosno et al. | 713/400 |
| 7,096,145 | B2 * | 8/2006 | Orenstien et al. | 702/132 |
| 7,219,252 | B1 * | 5/2007 | Li et al. | 713/501 |
| 7,228,445 | B2 * | 6/2007 | Yamashita et al. | 713/322 |
| 2003/0229816 | A1 * | 12/2003 | Meynard | 713/600 |
| 2006/0004538 | A1 * | 1/2006 | Cancel | 702/136 |
| 2007/0061606 | A1 * | 3/2007 | Wilson et al. | 713/500 |
| 2007/0168686 | A1 * | 7/2007 | Pessolano | 713/500 |

OTHER PUBLICATIONS

"Dynamic Overclocking: MSI D.O.T. vs. Gigabyte C.I.A.," from website http://www.digit.life.com/articles2/msi-dot-review/, pp. 1-11, printed Aug. 26, 2004.

* cited by examiner

*Primary Examiner*—Minh Dieu Nguyen
(74) *Attorney, Agent, or Firm*—Townsend and Townsend and Crew, LLP

(57) ABSTRACT

Methods, apparatuses, and systems are presented for dynamically overclocking a processor comprising operating the processor at a clock rate to run an executable program by using the processor to carry out a plurality of instructions associated with the executable program, while the processor is running the executable program, repeatedly monitoring at least one activity measure associated with a specific operation of the processor, wherein the at least one activity measure is generated from within the processor, evaluating the at least one activity measure to determine whether a predefined condition representing processor activity level is met, and, if the predefined condition is met, dynamically adjusting the clock rate of the processor to modify execution speed at which the processor carries out instructions.

22 Claims, 8 Drawing Sheets

AUTO TUNE DYNAMIC OVER CLOCKING

BACKGROUND OF THE INVENTION

Overclocking has been utilized as an efficient technique for improving processor performance by utilizing existing capabilities of a processor to function at elevated speeds. Generally speaking, overclocking involves operating a processor at a clock rate that is greater than a nominal clock rate, such as the processor manufacturer's suggested clock rate, to increase the overall rate at which the processor executes its operations. It may be possible to operate a processor at overclocked speeds because suggested clock rates are often specified to be lower than that of the processor's actual capability, creating a margin of unutilized performance capacity. By operating the processor at a clock rate beyond the suggested clock rate, the processor's unutilized performance capacity can be exploited without incurring significant costs. Overclocking may be applicable to a wide range of different computer processors and computer systems. As long as a margin exists to allow a processor to be operate at speeds higher than a nominal clock speed specified for the processor, overclocking can potentially be utilized to achieve considerable performance improvements.

FIG. 1 is a block diagram of an illustrative computer system 100 containing a processing unit that may be overclocked. As mentioned above, overclocking may be applicable to different types of computer processors and computer systems. FIG. 1 merely provides one example of such a system. As shown, computer system 100 includes a graphics card 102, a central processing unit (CPU) 104, a chipset comprising a northbridge chip 106 and a southbridge chip 108, system memory 110, peripheral component interconnect (PCI) slots 112, a disk drive controller 114, universal serial bus (USB) connectors 116, audio CODEC 118, a super I/O controller 120, and a keyboard controller 122. As shown in FIG. 1, graphics card 102 includes a graphics processing unit (GPU) 124 and local memory 126. Also, graphics card 102 is connected to a display 128 that may be part of computer system 100. Here, GPU 124 is a semiconductor chip designed to perform graphics processing operations associated with rendering an image that may be presented on display 128.

CPU 104 performs its operations based on a processor clock. This clock may be generated externally or internally with respect to CPU 104. The processor clock may be generated by multiplying-up or dividing-down a source signal, such as another clock signal or a reference signal generated from an oscillating crystal. The processor clock used by CPU 104 may be adjusted to different rates in a variety of ways. For example, the multiplier value for multiplying-up the source signal, or the divider value for dividing-down the source signal, may be changed in order to modify the rate of the processor clock. As another example, the source signal itself may be adjusted to a higher or lower rate, in order to modify the rate of the processor clock. Also, a combination of such techniques can be employed. Thus, different methods can be used to adjust the rate of the processor clock utilized by CPU 104.

By adjusting the processor clock used by CPU 104 to a clock rate that is greater than the nominal or suggested clock rate of CPU 104, the overall speed with which CPU 104 carries out its operations may increased correspondingly. This can result in significant performance improvements for CPU 104 in particular, as well as for computer system 100 in general. Operations of CPU 104 affect other components of computer system 100. For example, operations of graphics card 102 and GPU 124 may rely on calculations and other tasks performed by CPU 104. By increasing the speed of CPU 104, performance of associated components such as graphics card 102 and GPU 124 may also be improved.

While overclocking has considerable potential for increasing computer processor and system performance in a cost-effective manner, there exist significant pitfalls associated with traditional overclocking techniques. For instance, a processor operated at elevated clock rates may be pushed beyond its actual capability, which can lead to a variety of failures ranging from occasional logical errors to permanent damage of hardware components within the processor. Further, operation at elevated clock rates for extended periods of time may shorten the useful life of the processor. One known technique for overclocking involves statically setting the processor clock to a particular clock rate above the manufacturer's suggested clock rate. This may be done, for example, by modifying the basic input/output system (BIOS) program of a computer system such as system 100, to alter parameters that determine the processor clock rate at system start up. Often, the particular clock rate that is statically set in this manner is chosen on the basis of trial and error. Such a basic overclocking technique allows performance to be increased but leaves the processor highly vulnerable to risks of failure and a shortened life expectancy. Specifically, the clock rate chosen by trial and error may be excessively high, leading to risks of failures such as logical errors and permanent damage to the processor. Also, by statically setting the overclocking clock rate, the processor is operated at elevated speeds at all times, regardless of usage. This further increases chances of failure and incurs excessive wear on integrated circuit components in the processor.

Despite the shortcomings of traditional techniques, overclocking provides considerable potential for improvements in performance. By taking advantage of existing, unutilized processor capacity, performance gains may be extracted with minimal expenditure of additional resources. As applications become more and more computationally intensive, the need increases for obtaining every possible gain in processor capability. Thus, there exists an urgent need for improved overclocking techniques which limit risks of failure and damage to the processor, while safely and cost-effectively obtaining increased performance in computer systems.

BRIEF SUMMARY OF THE INVENTION

The present invention relates to methods, apparatuses, and systems for dynamically overclocking a processor comprising operating the processor at a clock rate to run an executable program by using the processor to carry out a plurality of instructions associated with the executable program, while the processor is running the executable program, repeatedly monitoring at least one activity measure associated with a specific operation of the processor, wherein the at least one activity measure is generated from within the processor, evaluating the at least one activity measure to determine whether a predefined condition representing processor activity level is met, and, if the predefined condition is met, dynamically adjusting the clock rate of the processor to modify execution speed at which the processor carries out instructions.

The at least one activity measure may comprise a count of instruction cache accesses performed by the processor. The at least one activity measure may comprise a count of data cache accesses performed by the processor. The at least one activity measure may also comprise both a count of instruction cache accesses performed by the processor and a count of data cache accesses performed by the processor. Further, the at least one activity measure may be evaluated by combining the at least one activity measure with a durational measure to produce a ratio and determining whether the ratio has reached a predefined level. The durational measure may be a count of clock cycles executed by the processor. The clock rate may be dynamically adjustable to a plurality of predefined clock rates, based on evaluation of the at least one activity measure.

According to one embodiment, the clock rate may be returned to a default clock rate if a hazard condition is detected. The hazard condition may be based on a temperature measure associated with the processor. The processor may support both a normal clocking mode in which the clock rate is fixed and an overclocking mode in which the clock rate is dynamically adjusted. In one embodiment, the normal clocking mode is activated if a temperature measure associated with the processor exceeds a threshold, and wherein the overclocking mode is activated if the temperature measure falls below the threshold. In another embodiment, the normal clocking mode is activated if a temperature measure associated with the processor crosses from below a first threshold to above the first threshold, and wherein the overclocking mode is activated the temperature measure crosses from above a second threshold to below the second threshold.

DETAILED DESCRIPTION OF THE INVENTION

Figure 1:
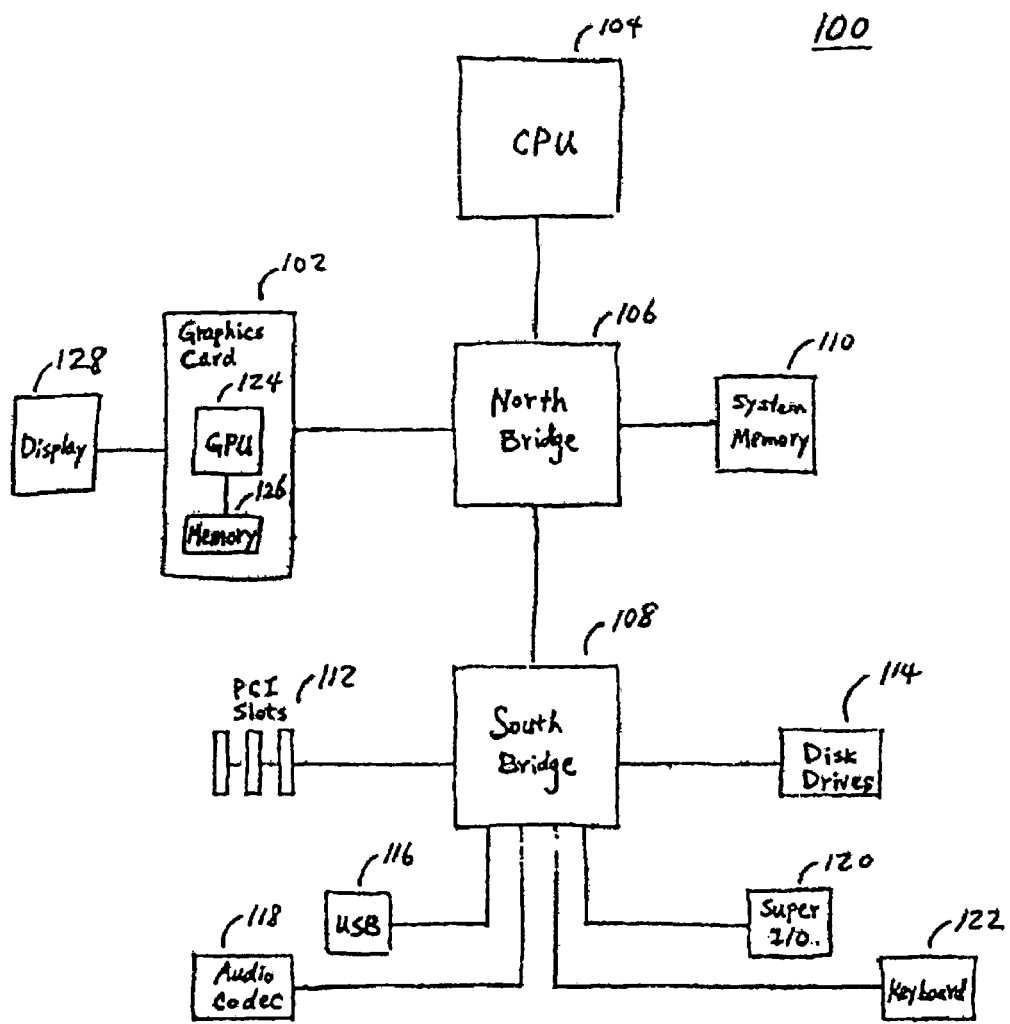
FIG. 1 is a block diagram of an illustrative computer system containing a processing unit that may be overclocked.
Figure 2:
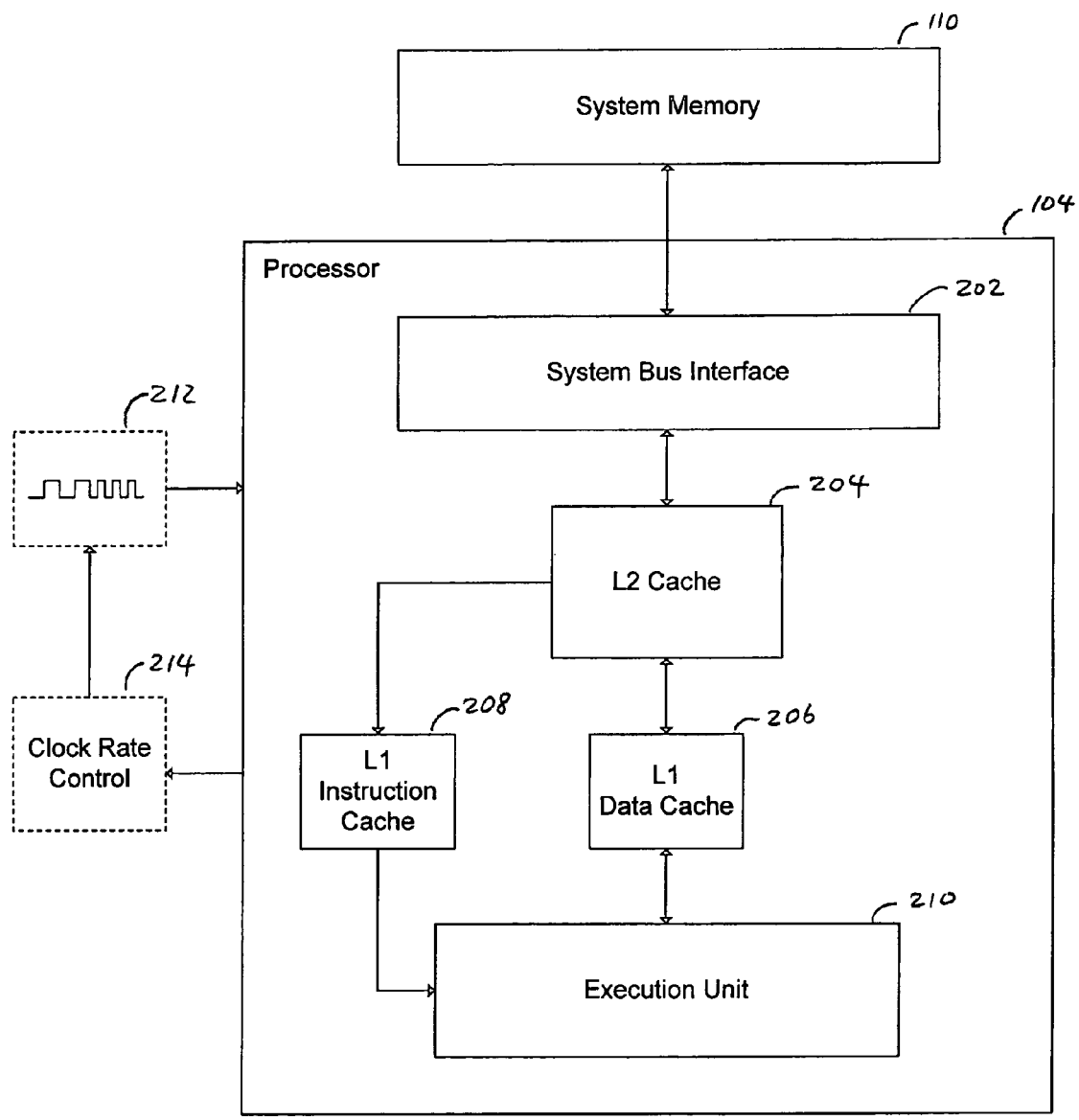
FIG. 2 is a more detailed block diagram of a processor that may be dynamically overclocked in accordance with one embodiment of the present invention.

FIG. 2 is a more detailed block diagram of a processor that may be dynamically overclocked in accordance with one embodiment of the present invention. Here, the processor is shown as CPU 104, previous described in FIG. 1. CPU 104 is connected to a portion of system memory, which is shown as system memory 110, also previously described in FIG. 1. CPU 104 may be a general purpose processor or special purpose processor, and may comprise numerous subsystems and components. For illustrative purposes, only a few of such components are explicitly shown in FIG. 2. Specifically, CPU 104 comprises a system bus interface 202, an L2 cache 204, an L1 data cache 206, an L1 instruction cache 208, and an execution unit 210. System bus interface 202 serves as a communication interface between CPU 104 and system memory 110. System bus interface 202 may be implemented using a variety of communications technologies, such as HyperTransport, Intel's Front Side Bus (FSB), and others. Execution unit 210 carries out instructions associated with one or more executable programs run by processor 104. Operation of execution unit 210 may involve fetching such instruction from memory and reading data from and/or writing data to memory in accordance with these instructions. The instructions and data may be read and/or written to system memory 110. To improve performance, a cache system may be employed comprising L2 cache 204, L1 data cache 206, and L1 instruction cache 208. For example, a subset of the data and instructions stored in system memory 110 may also be stored in L2 cache 204. Further, a subset of the data stored in L2 cache 204 may also be stored in L1 data cache 206, and a subset of the instructions stored in L2 cache 204 may also be stored in L1 instruction cache 208. The selection what data or instruction to stored in which cache may depend on a particular caching policy. For example, the most recently used data or instructions may make up the contents of each cache. Many different types and variations of caching systems and caching policies are well known and may be applicable to embodiments of the present invention. Operation of L2 cache 204, L1 data cache 206, and L1 instruction cache 208 is described here as one example.

To fetch a particular instruction from memory, execution unit 210 may request the instruction first from L1 instruction cache 208, then L2 cache 204, and lastly system memory 110. Similarly, to fetch a particular piece of data from memory, execution unit 210 may request the data first from L1 data cache 206, then L2 cache 204, and lastly system memory 110. To write a piece of data to memory, execution unit may first write to L1 data cache, which may cause the data to be written to L2 cache 204, and finally to system memory 110. There may be additional details and variations on the functionality of the cache system not explicitly discussed here that are within the knowledge of one of ordinary skill in the art.

According to one embodiment of the invention, CPU 104 utilizes a clock signal that may be dynamically adjusted to different rates, including rates above a manufacturer's suggested processor clock rate for CPU 104, based on a measure of activity of CPU 104. As shown in FIG. 2, this clock signal is provided by a clock signal block 212, which is controlled by a clock rate control block 214. Here, clock rate control block 212 monitors one or more activity measures that may be associated with one or more specific operations of the processor, in order to observe the activity level of CPU 104. This allows the processor clock rate to be increased only when such higher rates are necessary. A high level of activity may indicate that CPU 104 is currently handling a large amount of processing and may benefit from faster operations associated an increase in the processor clock rate. Conversely, a low level of activity may indicate that CPU 104 is currently handling a lower amount of processing and would not benefit much, if at all, from faster operations associated with an increase in the processor clock rate. In fact, operating the processor clock at elevated rates when it is not necessary may only increase risks of failure and incurs excessive wear on integrated circuit components in the processor, without providing any added benefit. Thus, clock rate control block 214 dynamically controls clock signal block 212 to ensure that an appropriate clock rate is provided to CPU 104, based the one or more activity measures received from CPU 104.

Other components within computer system 100 may also benefit from performance increases of CPU 104 resulting from oveclocking. For example, graphics operations associated with graphics card 102 and GPU 124 that rely on processing performed CPU 104 may also be enhanced. While FIG. 1 shows a single graphics card 102 and a single GPU 124 for purposes of illustration, computer system 100 may comprise more than one graphics card 102. Also, each graphics card 102 may comprise more than one GPU 124. Performance gains achieved through dynamic overclocking of CPU 104 may be especially useful during high intensity graphics operations.

Returning to FIG. 2, while clock signal block 212 and clock rate control block 214 are shown in FIG. 2 as separate components positioned outside CPU 104, one or both of these blocks may be implemented either inside or outside CPU 104, either separately or together as one unit. Further, one or both of clock signal block 212 and clock rate control block 214 may be implemented in software, hardware, or a combination of hardware and software. For example, in one embodiment of the invention, clock signal block 212 and clock rate control block 214 are implemented as part of a software routine carried out by northbridge chip 106 to control CPU 104. Specifically, such a software routine may operate to periodically monitor activity measures obtained from CPU 104 and perform calculations based on the activity measures to determine whether processor activity has reached a predetermined threshold, and if so, dynamically adjust the processor clock rate used by CPU 104 to a higher rate.

Referring again to FIG. 2, the activity measures may be generated from within the processor. For example, clock rate control block 214 may received a count, generated from within CPU 104, of the number of times a cache unit has been accessed. Such a count may be used to determine the frequency with which CPU 104 has accessed a particular cache unit. Frequency cache accesses can indicate that CPU 104 is currently handling a large amount of processing. Conversely, infrequent cache accesses can indicate that CPU 104 is currently handling a lower amount of processing. Thus, counts of cache accesses may serve as useful measures of the level of activity of CPU 104. By utilizing activity measures generated from with CPU 104, the need for installation of additional hardware for generating activity measures may be substantially eliminated. This may represent a significant advantage, especially if there are considerable design, manufacturing, and time costs associated with adding such hardware.

In one embodiment of the invention, a count of the number of times a data cache, such as L1 data cache 206, has been accessed may be used as an activity measure. In another embodiment of the invention, a count of the number of times an instruction cache, such as L1 instruction cache 208, has been accessed may be used as an activity measure. In yet another embodiment of the invention, both a count of data cache accesses and a count of instruction cache accesses may be used as activity measures to determine the proper processor clock rate. Such utilization of both a data cache access count and an instruction cache access count may be useful to provide a more complete assessment of the currently level of processor activity. Some processor operations may be more data-access intensive. For example, certain graphic display rendering routines may involve large number of reads and writes to memory with few instruction fetches. By contrast, other processor operations may be more instruction-access intensive. For example, certain mathematical computation routines may involve a large number of instruction fetches with few accesses to memory to read or write data. By using both data cache access count and instruction cache access count to serve as activity measures, a more complete representation can be obtained to indicate the current level of activity of the processor.

Figure 3:
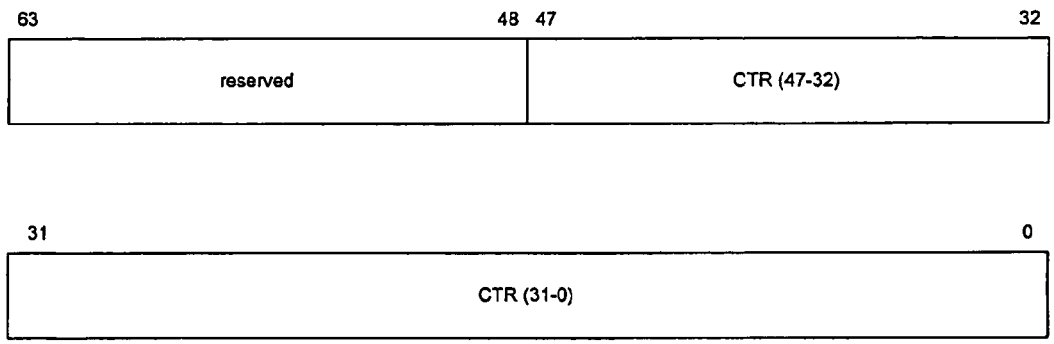
FIG. 3 illustrates a counter register in a processor that may be used for providing an activity measure, in accordance with one embodiment of the present invention.

FIG. 3 illustrates a counter register in a processor, such a CPU 104, that may be used for providing an activity measure, in accordance with one embodiment of the present invention. In the present embodiment of the invention, CPU 104 may provide a number of counter registers that may be programmed as counters for counting different events associated with operation of CPU 104. These counter registers may normally be used, for example, for debugging purposes. FIG. 3 shows one such register. As shown in the figure, the counter register is 64 bits wide. However, only the lower 48 bits of the register are used. While FIG. 3 shows a single 64-bit counter register, CPU 104 may have a number of such counter registers. One of these counter registers may be programmed to keep a count of the number of times CPU 104 accesses L1 data cache 206, while another one of these counter registers may be programmed to keep a count of the number of times CPU 104 accesses L1 instruction cache 208. Accordingly, the counter registers may be used to provide separate counts of data cache accesses and instruction cache accesses. The counter registers may then be read to provide activity measures associated with CPU 104.

Figure 4:
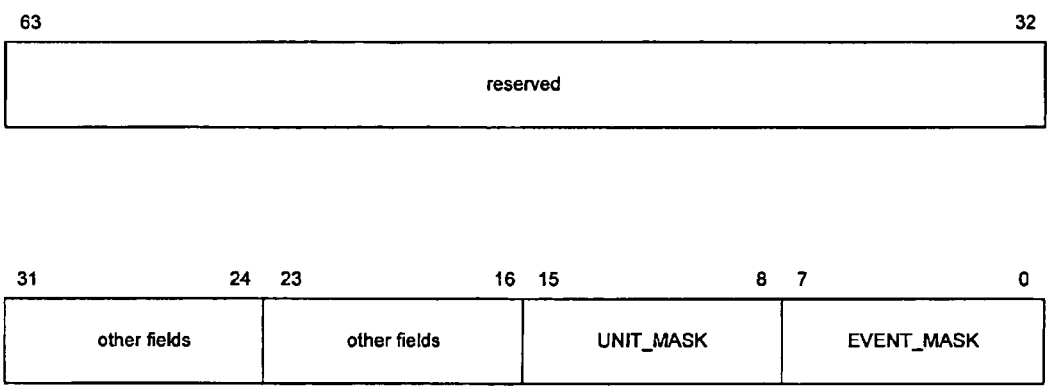
FIG. 4 illustrates a configuration register in a processor that may be used to program a counter register such as that shown in FIG. 3, in accordance with one embodiment of the present invention.

FIG. 4 illustrates a configuration register in a processor, such as CPU 104, that may be used to program a counter register such as that shown in FIG. 3, in accordance with one embodiment of the present invention. Here, a counter register such as the one shown in FIG. 3 may need to be properly programmed before it can serve as a counter for counting related to a specific event. For each counter register, there may be a corresponding configuration register that controls the operation of the counter register. As shown in the figure, counter register is a 64 bit register that contains an 8-bit EVENT_MASK field. Specific values written to the EVENT_MASK field selects the particular event within CPU 104 that is tracked by the particular counter register. For example, to program a first counter register for counting the number of times CPU 104 accesses L1 data cache 206, a specific value may be written to the EVENT_MASK field of the configuration register corresponding to the first counter register. Similarly, to program a second counter register for counting the number of times CPU 104 accesses L1 instruction cache 208, a different value may be written to the EVENT_MASK field of the configuration register corresponding to the second counter register. In FIG. 4, the counter register shown also includes an 8-bit UNIT_MASK field, which may be used to further select a specific unit tracked by the counter register if multiple units in CPU 104 correspond to a particular event. For example, if multiple units of data caches exist in CPU 104, UNIT_MASK field may be used to program the counter register for counting the number of times CPU 104 accesses a specific data cache unit. In addition, the configuration register shown in FIG. 4 may contain other fields that may used for further programming and control of the corresponding counter register. For example, these other fields may control counter enable/disable, increment/decrement functionality, the handling of overflows associated with the counter register. By writing appropriate values to a configuration register, a corresponding counter register can be properly programmed to keep track of counts such as number of data access and instruction accesses, which may be used as activity measures for CPU 104.

Figure 5:
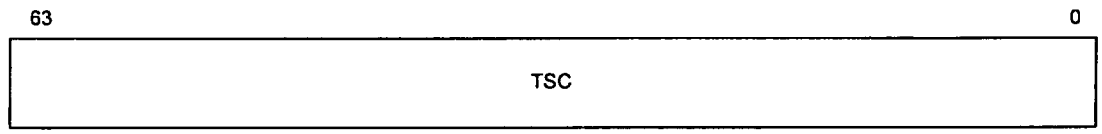
FIG. 5 illustrates time-stamp counter register in a processor that may be used for providing a durational measure, in accordance with one embodiment of the present invention.

FIG. 5 illustrates time-stamp counter register in a processor, such as CPU 104, that may be used for providing a durational measure, in accordance with one embodiment of the present invention. A durational measure may be used to provide an assessment of duration, in terms of time or in terms of clock cycles, over which other measurements are taken. The register shown in FIG. 5 is 64 bits wide and corresponds to a time-stamp counter that counts processor clock cycles. The time-stamp counter is initialized to a value of 0 reach time the processor is reset. Thereafter, the time-stamp counter increments by 1 for every processor clock cycle. When the time-stamp counter overflows (i.e., all bits of the 64-bit register have values of 1), the time-stamp counter wraps to a value of 0 and continues counting. The 64-bit register allows the time-stamp count to grow to quite a large number before overflowing. For example, for a processor using a 1 GHz processor clock, the 64-bit time-stamp counter would not overflow for a few hundred years. By reading the time-stamp counter at a first point in time, then reading the time-stamp counter again at a second point in time, an elapsed-time value can be obtained by subtracting the first measurement from the second measurement. Here, the unit of durational measurement is number of processor clock cycles. This may be translated into a time duration by taking into account the processor clock rate.

As mentioned previously, in one embodiment of the present invention, a software routine carried out by north bridge chip 106 may operate to periodically monitor activity measures obtained from CPU 104 and perform calculations based on the activity measures to determine whether processor activity has reached a predetermined threshold, and if so, dynamically adjust the processor clock rate used by CPU 104 to a higher rate. For instance, the software routine may accomplish this by writing to one or more configuration registers to program one or more counter registers to keep track of the number of data cache accesses and/or instruction cache accesses performed by CPU 104. The software routine may then repeatedly read the counter registers to monitor the counts of data cache accesses and/or instruction cache accesses to determine whether to perform dynamically adjustments to the processor clock rate. The software routine may utilize a periodic interrupt, or some other type of interrupt that occurs repeatedly, to invoke operations for reading the counter registers and performing the necessary dynamic adjustment to the processor clock rate.

As an example, at each interrupt, the software routine may read the current value of a counter register programmed to keep track of the number of L1 instruction cache 208 accesses performed by CPU 104, as well as the current value of the time-stamp counter. The software routine may then compare these current values to previous values read from the same registers at the last interrupt. This produces differential values that reflect the number of L1 instruction cache 208 accesses since the last interrupt, as well as the number of elapsed processor cycles since the last interrupt:

CacheAccessCnt=CurrentCnt−PreviousCnt

ElapsedCycles=CurrentTSC−PreviousTSC

By combining these differential values, such as through a division operation to produce a ratio, a measure of the frequency of with which CPU 104 accessed the L1 instruction cache 208 during the elapsed time period may be obtained:

CacheAccessFreq=CacheAccessCnt/ElapsedCycles

This measure of L1 instruction cache access frequency may then be compared with a threshold. If the L1 instruction cache access frequency is above the threshold, indicating a high level of processor activity, the software routine may increase the processor clock rate for CPU 104 in order to allow CPU 104 to operate with greater speed to better accommodate the high level of processor activity. The increased processor clock rate may be an overclocking clock rate for CPU 104. On the other hand, if the L1 instruction cache access frequency is below the threshold, indicating a low level of processor activity, the software routine may decrease the processor clock rate or return the processor clock rate to a nominal rate, such as CPU 104's manufacturer suggested clock rate.

In a similar manner, the software routine may obtain a measure of L1 data cache access frequency. Thus, in an alternative embodiment of the invention, L1 data cache access frequency may be used to dynamically adjust the processor clock rate. As mentioned previously, it may be the case that using both a data cache access frequency and an instruction cache access frequency provides a more complete account of the level of activity of CPU 104. Thus, in yet another embodiment of the invention, both the measure of L1 instruction cache access frequency and the measure of L1 data cache access frequency may be combined to form a composite figure representing the level of activity of CPU 104.

Furthermore, the processor clock rate may be adjusted to more than one overclocking rate. For example, a number of different predefined overclocking rates may be used. Depending on the data cache access frequency, instruction cache access frequency, a composite figure of processor activity as described above, or some other measure of processor activity, one of the predefined overclocking rates may be applied. In one embodiment of the invention, the higher the level of processor activity, the higher the overclocking rate applied.

A processor clock that is operated at an overclocking rate may be returned to a nominal rate, or non-overclocking rate, if a hazard condition is detected. For example, if temperature of CPU 104 rises above a particular temperature threshold, indicating an overheat condition likely caused by excessive processing speed, the processor clock rate may be returned to a non-overclocking rate to prevent failures such as permanent damage to CPU 104. There may be different ways of obtaining measurements of the temperature of CPU 104. For instance, a software routine in the northbridge chip 106 may obtain such a temperature measurement from a temperature sensor installed in computer system 100. Such a temperature sensor may be attached to CPU 104, placed in proximity to CPU, or otherwise thermally coupled to CPU 104.

In accordance with one embodiment of the invention, two modes of operation may be available: (1) an overclocking mode, in which the processor clock rate is dynamically adjusted to overclocking rates, as discussed in various embodiments above, and (2) a non-overclocking mode, or normal mode, in which the processor clock rate is fixed at the nominal rate, or non-overclocking rate. CPU 104 may be operated in the overclocking mode if temperature of CPU 104 is below a certain temperature threshold. CPU 104 may be operated in the non-overclocking mode if temperature of CPU 104 is above the temperature threshold.

Figure 6:
FIG. 6 is a plot of processor temperature versus time for a processor quickly switching between an overclocking mode and a non-overclocking mode, when using a single temperature threshold, according to one embodiment of the invention.

FIG. 6 is a plot of processor temperature versus time for a processor quickly switching between an overclocking mode and a non-overclocking mode, when using a single temperature threshold, according to one embodiment of the invention. As shown in this figure, the single temperature threshold is set at 80 degrees Celsius (80° C.). The switching of CPU 104 between overclocking mode and non-overclocking mode, based on this single temperature threshold, may lead to excessive oscillations between the two modes, which may not be desirable. For example, a some point in time, CPU 104 may be operating in the overclocking mode. This means CPU 104 may be using a processor clock rate that is above the nominal, or suggested clock rate for CPU 104. Operation at such overclocking rates may tend to drive the temperature of CPU 104 upwards. Thus, as shown in FIG. 6, the temperature of CPU 104 operating in overclocking mode may start at a point below the 80° C. threshold and climb up to reach the 80° C. threshold. Upon reaching the 80° C. threshold, CPU 104 is switched from overclocking mode to the non-overclocking mode. However, the effect turning off overclocking may not be immediately seen in the temperature of CPU 104. In fact, as shown in FIG. 6, the temperature may continue to climb to levels above the 80° C. threshold, peak, and then begin to fall. As the temperature falls back down below the 80° C. threshold, CPU 104 is switched back to overclocking mode. Similarly, the effects of turning on overclocking may not be immediately seen in the temperature of CPU 104. As shown in FIG. 6, the temperature may continue to fall to levels below the 80° C. threshold, bottom out, and then begin to rise. The cycle described above may then repeat over and over again.

Thus, the interplay between overclocking/non-overclocking mode switching and the temperature of CPU 104 causes the temperature oscillations illustrated in FIG. 6. These oscillations may be undesirable in various implementations. For example, if the oscillations are occurring too rapidly, the overclocking technique may become overly inefficient, as CPU 104 is constantly switched between the overclocking mode and the non-overclocking mode.

Figure 7:
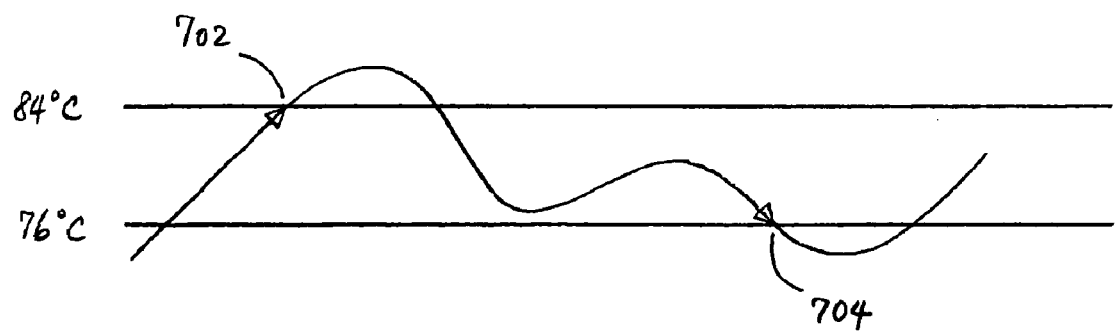
FIG. 7 is a plot of processor temperature versus time for a processor more gradually switching between an overclocking mode and a non-overclocking mode, when using two distinct temperature thresholds, according to another embodiment of the invention.

FIG. 7 is a plot of processor temperature versus time for a processor more gradually switching between an overclocking mode and a non-overclocking mode, when using two distinct temperature thresholds, according to another embodiment of the invention. As shown in this figure, the two temperature thresholds are set at 76° C. and 84° C., respectively. Use of these two distinct temperature thresholds allows switching between the two modes to occur more gradually. According to one embodiment of the invention, the two distinct temperature thresholds may be used to control switching between overclocking mode and non-overclocking modes as follows. If the temperature reaches the higher threshold (e.g., 84° C.), and the temperature is climbing, switch to the non-overclocking mode; if the temperature reaches the lower threshold (e.g., 76° C.), and the temperature is falling, switch to the overclocking mode.

For example, a some point in time, CPU 104 may be operating in the overclocking mode. Operation at overclocking rates may tend to drive the temperature of CPU 104 upwards. Thus, as shown in FIG. 7, the temperature of CPU 104 operating in overclocking mode may start at a point below the higher threshold of 84° C. threshold and climb up to reach the 84° C. threshold (at point 702). Because the temperature has reached the higher threshold of 84° C., and the temperature is climbing, CPU 104 is switched from overclocking mode to non-overclocking mode. As described previously, effects turning off overclocking may not be immediate, and the temperature may continue to climb to levels about the 84° C. threshold, peak, and then begin to fall. As the temperature falls back down below the higher threshold of 84° C., operation continues in the non-overclocking mode. Thus, CPU 104 may operate and have temperature fluctuations between the higher threshold of 84° C. and the lower threshold of 76° C., without any switching of the overclocking/non-overclocking mode. At some point, the temperature may reach the lower threshold of 76° C. (at point 704). Because the temperature has reached the lower threshold of 76° C., and the temperature is falling, CPU 104 is switched from non-overclocking mode to overclocking mode. Again, effects turning on overclocking may not be immediate, and the temperature may continue to fall to levels below the 76° C. threshold, bottom out, and then begin to rise again. Accordingly, switching between the overclocking mode and the non-overclocking mode does oscillate about a single temperature threshold. Instead, the processor temperature is allowed to fluctuate between the higher and lower temperature thresholds without any overclocking/non-overclocking mode switching. This provides a more gradual manner of transitioning from overclocking mode to non-overclocking mode, and vice versa.

Use of two distinct temperature thresholds, as described above, may require relatively more involved operations. For example, it may be necessary to determine not only whether the processor temperature is above or below a certain threshold, but also whether the temperature is rising or falling at such a point in time. For example, a software routine carried out by northbridge chip 106 may obtain periodic measures of processor temperature and store at least one previously recorded temperature measurement, such as the immediately prior temperature measurement. By comparing the current temperature measurement to the previous temperature measurement, it can be determined whether the temperature is falling or rising.

Figure 8:
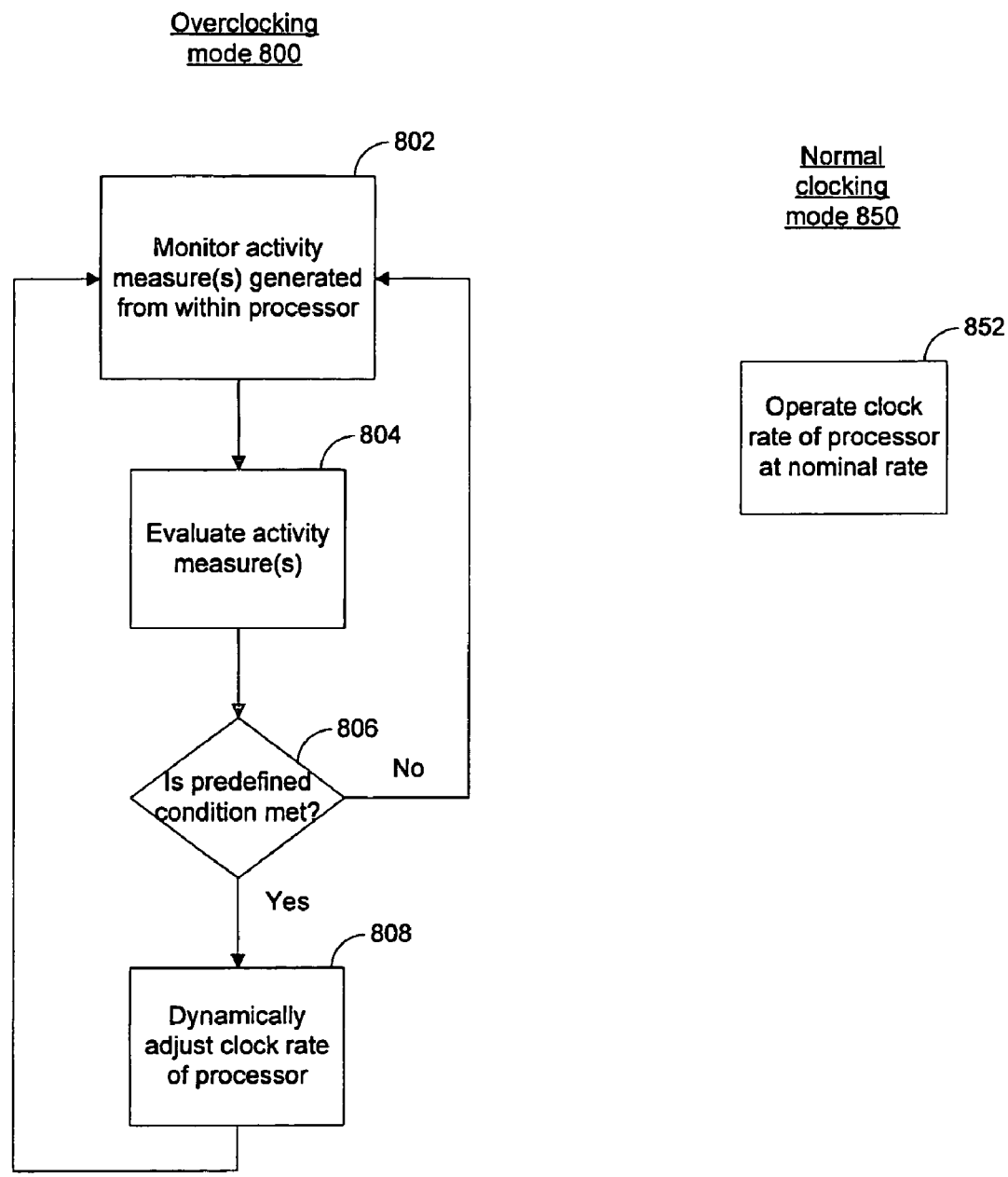
FIG. 8 presents block diagrams outlining operation of an overclocking mode and a normal clocking mode, in accordance with one embodiment of the invention.

FIG. 8 presents block diagrams outlining operation of an overclocking mode 800 and a normal clocking mode 850, as described above in accordance with one embodiment of the invention. As illustrated in the figure, the overclocking mode 800 begins with a step 802 in which at least one activity measure is monitored. For example, the at least one activity measure may include number of instruction cache accesses and/or number data cache accesses, as described previously. In a step 804, the at least one activity measure is evaluated. For example, this evaluation step may involve various calculations to produce a measure of cache access frequency. Next, in a step 806, a determination is made as to whether a predefined condition is met. This, for example, may comprise determining whether the measure of cache access frequency has exceeded a particular threshold. If the predetermined condition is met, then in a step 808, the clock rate of the processor is dynamically adjusted. Step 808 is followed by a return to step 802, and the entire process may repeat. If the predetermined condition is not met, step 806 is followed by a return to step 802, and the entire process may repeat. Also illustrated in the figure is the normal clocking mode 850, which is shown as a step 852, in which clock rate of the processor is operated at a nominal rate.

Figure 9:
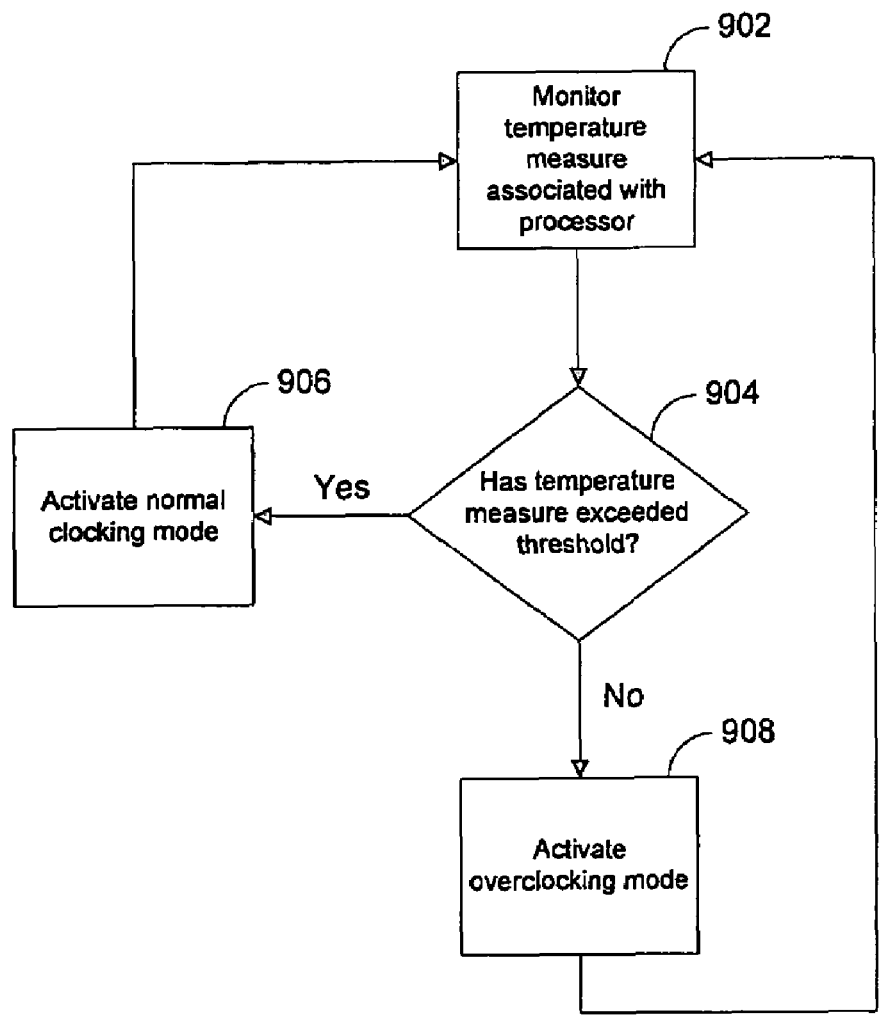
FIG. 9 presents a block diagram outlining steps for switching between a normal clocking mode and an overclocking mode, using a single threshold, in accordance with one embodiment of the invention.

FIG. 9 presents a block diagram outlining steps for switching between a normal clocking mode and an overclocking mode, using a single threshold, in accordance with one embodiment of the invention. In a step 902, a temperature measure associated with a processor is monitored. In a step 904, a determination is made as to whether the temperature measure has exceeded a particular threshold. If so, then in a step 906, the normal clocking mode is activated. Step 906 is followed by a return to step 902, and the entire process may repeat. Otherwise, in a step 908, the overclocking mode is activated. Step 908 is also followed by a return to step 902, and the entire process may repeat. Here, it should be understood that upon entering step 906, if the normal clocking mode is already activated, the activating step in step 906 may simply denote continued operation in the normal clocking mode. Similarly, it should be understood that upon entering step 908, if the overclocking mode is already activated, the activating step in step 908 may simply denote continued operation in the overclocking mode.

Figure 10:
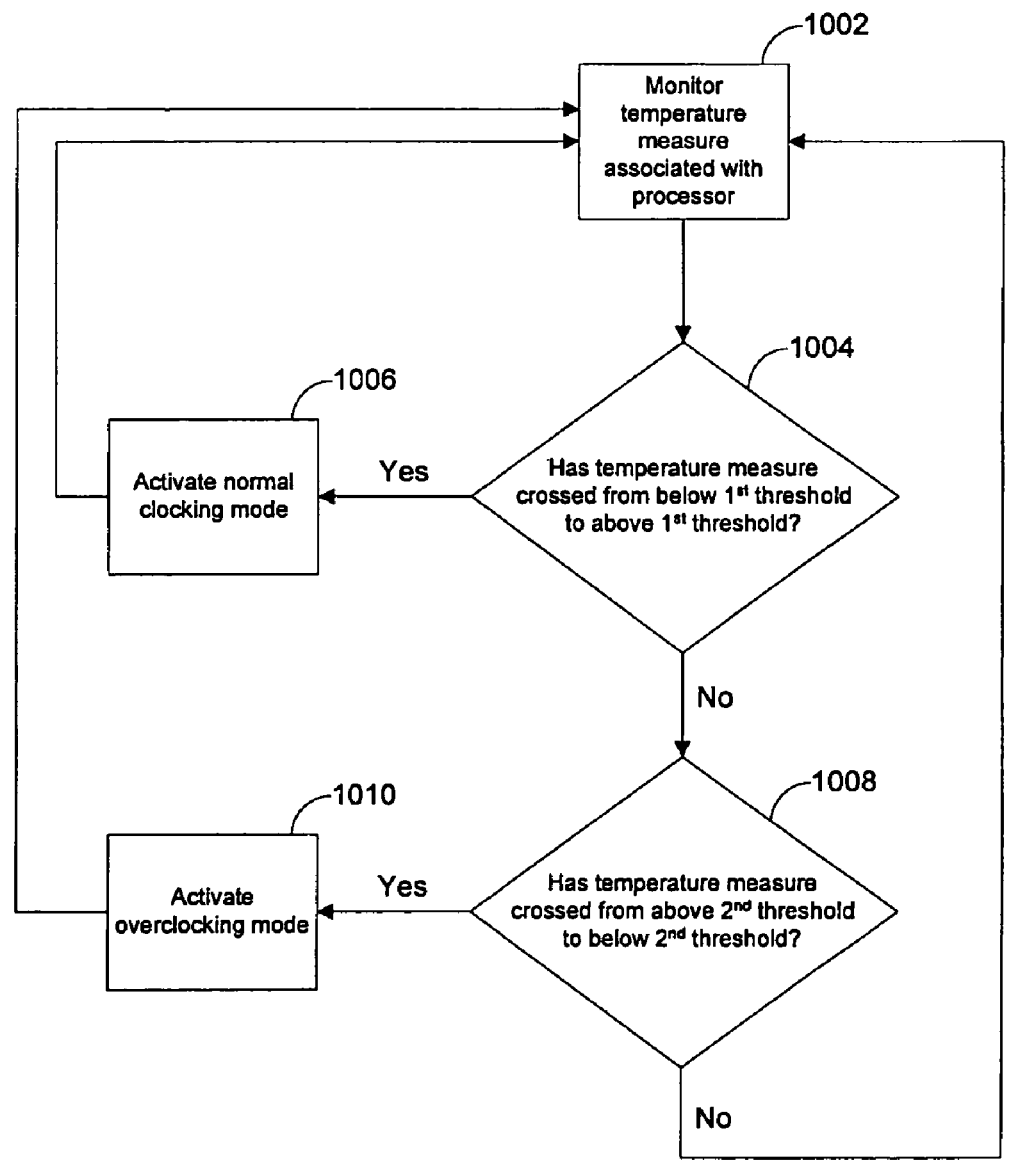
FIG. 10 presents a block diagram outlining steps for switching between a normal clocking mode and an overclocking mode, using a first and a second threshold, in accordance with one embodiment of the invention.

FIG. 10 presents a block diagram outlining steps for switching between a normal clocking mode and an overclocking mode, using a first and a second threshold, in accordance with one embodiment of the invention. In a step 1002, a temperature measure associated with a processor is monitored. In a step 1004, a determination is made as to whether the temperature measure has crossed from below the first threshold to above the first threshold. If so, then in a step 1006, the normal clocking mode is activated. Step 1006 is followed by a return to step 1002, and the entire process may repeat. Otherwise, in a step 1008, a determination is made as to whether the temperature measure has crossed from above the second threshold to below the second threshold. If so, in a step 1010, the overclocking mode is activated. Otherwise, step 1008 is followed by a return to step 1002, and the entire process may repeat. Again, it should be understood that upon entering step 1006, if the normal clocking mode is already activated, the activating step in step 1006 may simply denote continued operation in the normal clocking mode. Similarly, it should be understood that upon entering step 1010, if the overclocking mode is already activated, the activating step in step 1010 may simply denote continued operation in the overclocking mode.

While the present invention has been described in terms of specific embodiments, it should be apparent to those skilled in the art that the scope of the present invention is not limited to the described specific embodiments. The specification and drawings are, accordingly, to be regarded in an illustrative rather than a restrictive sense. It will, however, be evident that additions, subtractions, substitutions, and other modifications may be made without departing from the broader spirit and scope of the invention as set forth in the claims.

What is claimed is:

1. A method for dynamically overclocking a processor comprising:
    operating the processor at a clock rate to run an executable program by using the processor to carry out a plurality of instructions associated with the executable program;
    wherein the processor includes a plurality of configuration registers, each configuration register comprising an event mask field and a unit mask field, the event mask field being configured to store an identifier of an event within the processor to be monitored and the unit mask field being configured to store an identifier of a unit within the processor that corresponds to the event being monitored, and wherein each configuration register controls the operation of a counter register configured to maintain a count of a number of occurrences of an event;
    for each configuration register for which an event to be monitored has been defined, performing the following:
        (a) while the processor is running the executable program, repeatedly monitoring at least one activity measure associated with a specific operation of the processor associated with the event to be monitored, wherein the at least one activity measure is generated from within the processor;
        (b) evaluating the at least one activity measure to determine whether a predefined condition representing processor activity level is met;
        (c) if the predefined condition is met, dynamically adjusting the clock rate of the processor to modify execution speed at which the processor carries out instructions.

2. The method of claim 1 wherein the at least one activity measure is evaluated by combining the at least one activity measure with a durational measure to produce a ratio and determining whether the ratio has reached a predefined level.

3. The method of claim 2 wherein the durational measure is a count of clock cycles executed by the processor.

4. The method of claim 1 wherein the clock rate is dynamically adjustable to a plurality of predefined clock rates, based on evaluation of the at least one activity measure.

5. The method of claim 1 further comprising:
    returning the clock rate to a default clock rate if a hazard condition is detected.

6. The method of claim 5 wherein the hazard condition is based on a temperature measure associated with the processor.

7. The method of claim 1 wherein the processor supports both a normal clocking mode in which the clock rate is fixed and an overclocking mode in which the clock rate is dynamically adjusted.

8. The method of claim 7 wherein the normal clocking mode is activated if a temperature measure associated with the processor exceeds a threshold, and wherein the overclocking mode is activated if the temperature measure falls below the threshold.

9. The method of claim 7 wherein the normal clocking mode is activated if a temperature measure associated with the processor crosses from below a first threshold to above the first threshold, and wherein the overclocking mode is activated if the temperature measure crosses from above a second threshold to below the second threshold.

10. The method of claim 1 wherein the at least one activity measure comprises both a count of instruction cache accesses performed by the processor and a count of data cache accesses performed by the processor.

11. An apparatus for dynamically overclocking a processor comprising:
    a processor capable of operating at a clock rate to run an executable program to carry out a plurality of instructions associated with the executable program, wherein the processor includes a plurality of configuration registers, each configuration register comprising an event mask field and a unit mask field, the event mask field being configured to store an identifier of an event within the processor to be monitored and the unit mask field being configured to store an identifier of a unit within the processor that corresponds to the event being monitored, and wherein each configuration register controls the operation of a counter register configured to maintain a count of a number of occurrences of an event;
    a clock rate control unit capable of, for each configuration register for which an event to be monitored is defined, repeatedly monitoring at least one activity measure associated with a specific operation of the processor while the processor runs the executable program, wherein the at least one activity measure is generated from within the processor;
    wherein the clock rate control unit is capable of evaluating the at least one activity measure to determine whether a predefined condition representing processor activity level is met;
    wherein the clock rate control unit is capable of dynamically adjusting the clock rate of the processor to modify execution speed at which the processor carries out instructions, if the predefined condition is met.

12. The apparatus of claim 11 wherein the at least one activity measure is evaluated by combining the at least one activity measure with a durational measure to produce a ratio and determining whether the ratio has reached a predefined level.

13. The apparatus of claim 12 wherein the durational measure is a count of clock cycles executed by the processor.

14. The apparatus of claim 11 wherein the clock rate is dynamically adjustable to a plurality of predefined clock rates, based on evaluation of the at least one activity measure.

15. The apparatus of claim 11 wherein the clock rate control unit is further capable of returning the clock rate to a default clock rate if a hazard condition is detected.

16. The apparatus of claim 15 wherein the hazard condition is based on a temperature measure associated with the processor.

17. The apparatus of claim 11 wherein the processor supports both a normal clocking mode in which the clock rate is fixed and an overclocking mode in which the clock rate is dynamically adjusted.

18. The apparatus of claim 17 wherein the normal clocking mode is activated if a temperature measure associated with the processor exceeds a threshold, and wherein the overclocking mode is activated if the temperature measure falls below the threshold.

19. The apparatus of claim 17 wherein the normal clocking mode is activated if a temperature measure associated with the processor crosses from below a first threshold to above the first threshold, and wherein the overclocking mode is activated if the temperature measure crosses from above a second threshold to below the second threshold.

20. The apparatus of claim 11 wherein the at least one activity measure comprises both a count of instruction cache accesses performed by the processor and a count of data cache accesses performed by the processor.

21. A system for dynamically overclocking a processor comprising:
    means for operating the processor at a clock rate to run an executable program by using the processor to carry out a plurality of instructions associated with the executable program, wherein the processor includes a plurality of configuration registers, each configuration register comprising an event mask field and a unit mask field, the event mask field being configured to store an identifier of an event within the processor to be monitored and the unit mask field being configured to store an identifier of a unit within the processor that corresponds to the event being monitored, and wherein each configuration register controls the operation of a counter register configured to maintain a count of a number of occurrences of an event;
    means for repeatedly monitoring, for each configuration register for which an event to be monitored is defined, at least one activity measure associated with a specific operation of the processor while the processor is running the executable program, wherein the at least one activity measure is generated from within the processor;
    means for evaluating the at least one activity measure to determine whether a predefined condition representing processor activity level is met;
    means for dynamically adjusting the clock rate of the processor to modify execution speed at which the processor carries out instructions, if the predefined condition is met.

22. The system of claim 21 wherein the at least one activity measure comprises both a count of instruction cache accesses performed by the processor and a count of data cache accesses performed by the processor.

* * * * *